Patented Aug. 31, 1937

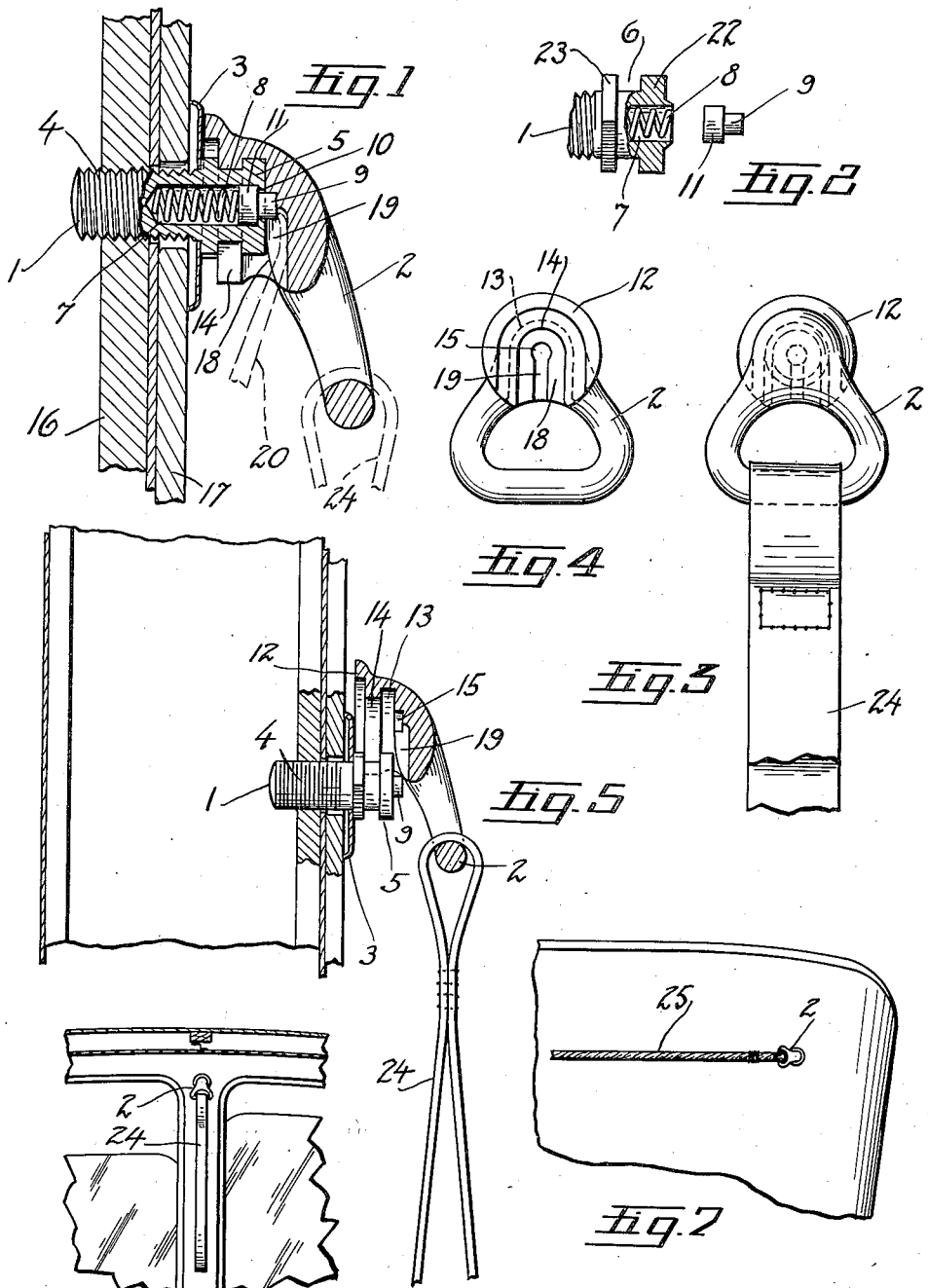

2,091,378

UNITED STATES PATENT OFFICE 2,091,378

FASTENING DEVICE

Emory Glenn Simpson and William Schnell, Detroit, Mich., assignors to Ternstedt Manufacturing Company, Detroit, Mich., a corporation of Michigan Application July 10, 1935, Serial No. 30,754

2 Claims. (Cl. 248—224)

This invention relates to a fastening device and more particularly to a fastening device such as may be used in an automobile body for securing in place and supporting an assist cord or a robe rail.

Among the objects of this invention is that of producing a fastening device which is neat in appearance, which is simple in structure, and the parts of which are easily assembled to each other and to the support for the fastening device.

In the drawing:

Fig. 1 is a section showing the fastening device assembly.

Fig. 2 is a detail of the support pin and detent.

Fig. 3 is an elevation of the fastening device.

Fig. 4 is a detail of the ring portion of the fastener.

Fig. 5 is a sectional view illustrating the assembling of the ring to the support pin.

Fig. 6 is an elevation showing the fastening device used in conjunction with an assist strap.

Fig. 7 shows the fastening device used with a flexible robe rail.

Referring more particularly to the drawing it will be seen that the fastening device assembly comprises a male member in the form of a screw pin 1, a female member in the form of a ring 2, and an escutcheon 3. The screw pin is provided with a threaded shank 4 and a head 5 having an annular groove 6 between two annular shoulders 22 and 23. The screw pin is also provided with a longitudinal bore 7 which receives a detent in the form of a coil spring 8 and plunger 9. The coil spring 8 backs up the plunger 9 and both are retained in the bore 7 by peening the edge of the opening 7 as at 10. The plunger 9 has a shoulder 11, the diameter of which is slightly less than that of the bore 7. The plunger 9 is mounted within the bore 7 so that the spring is under tension. The thrust exerted by the spring upon the plunger 9 normally maintains the plunger in the position shown in Fig. 1 with the shoulder 11 abutting against the peened over edge 10 of the bore and the reduced end of the plunger projecting beyond the headed end of the screw pin 1.

The ring 2 is provided with a head 12, the inside face of which is provided with a concavity 13 and a U-shaped rib 14 which engages the head 5 of the screw pin 1 in the annular groove 6. The head 12 is also provided with a recess 15 which serves as a socket to receive the reduced end of the plunger 9.

In assembling the fastening device to its support the escutcheon 3 is first passed over the threaded shank of the screw pin 1 and the screw pin, with the detent 8, 9 previously mounted therein, is then screwed into the support. As shown in Fig. 1 the fastening device is used for fastening an assist cord to the inside wall of a vehicle body. In such case the inner wall 16 of the body pillar is drilled and tapped for receiving the screw pin 1 and the trimming 17 is provided with a suitable opening through which the pin is passed.

Thereafter the head 12 of the ring 2 is slipped over the head of the pin 1 so that the U-rib 14 engages the head of the pin in the annular groove 6. As the ring 2 is being slipped over the head of the pin the projecting end of the plunger 9 engages the bottom face 18 of the concavity 13 in the head 12 of the ring as shown in Fig. 5. This face 18 is inclined and acts as a cam surface to retract the projected plunger 9 as the ring is being slipped on to the head of the pin 1. As soon as the ring is assembled to the pin so that the rib 14 engages in the annular groove 6, the retracted plunger 9 comes opposite of the socket 15 and thereupon snaps into place as shown in Fig. 1 and in conjunction with the interengagement of the rib 14 and groove 6 locks the ring 2 on to the pin 1. It will be noted that this interlocking engagement between the pin 1 and the ring 2 permits the ring to swivel upon the pin and that the interlocking means is completely concealed.

To remove the ring 2 from the pin 1 a concealed slot 19 is provided in the cam face 18 of the ring. This slot 19, as shown clearly in Fig. 4, is narrower than the diameter of the socket 15 and permits a suitable tool 20, similar to an icepick, to be inserted behind the projecting plunger 9 to disengage the plunger 9 from the socket 15 whereupon the ring may be slipped off the pin 1.

In Fig. 6 the fastening device is shown with an assist strap 24 for securing the same to a support and in Fig. 7 with a robe rail 25. It is understood that these are but two of numerous uses for the above described fastening device.

In addition to permitting the swiveling of the ring 2 upon the pin 1 and removably locking the ring 2 upon the pin 1, the spring projected plunger 9 functions as an anti-rattling device preventing any looseness and consequent rattling between the ring and the pin.

We claim:

1. A fastening device for securing an assist cord, robe rail, or the like within a vehicle body, comprising male and female members, the said male member being in the form of a pin provided with an annular shoulder and adapted to be secured to a support within the vehicle body, a female member having a concavity in its inside face and a U-shaped rib in the said concavity whereby the female member may be slipped laterally over the pin with the shoulder of the pin engaging behind the U-shaped shoulder to swivelly secure the female member upon the pin, a detent in the form of a coil spring and cylindrical plunger, a cylindrical bore along the longitudinal axis of the pin for receiving the coil spring and plunger, the said coil spring being positioned behind the plunger and normally holding the plunger so that it projects beyond the end of the pin, a concealed cylindrical socket in the bottom face of the female member and communicating with the concavity, the said face of the concavity being inclined outwardly to serve as a cam surface when the female member is passed over the pin to retract the plunger and retain the same in retracted position until the socket becomes aligned with the plunger to permit the same to seat in the socket, and a recess in the bottom face of the said concavity narrower than the diameter of the said socket extending from the socket to the surface of the female member whereby access may be had to the spring actuated plunger to disengage the same and permit separation of the male and female members.

2. A self-locking fastening device for securing an assist cord, robe rail, or the like within a vehicle body, comprising male and female members, the male member comprising a pin provided with a circumferential shoulder and adapted to be secured to a support within the vehicle body, the female member having a concavity in its inner face extending outwardly to the surface and provided with a U-shaped rib whereby the female member may be passed transversely of the longitudinal axis of the pin so that the pin passes through the mouth of the U-shaped rib and concavity and the rib on the pin engages between the U-shaped rib and the bottom face of the concavity, a spring actuated plunger mounted in and along the longitudinal axis of the pin and normally projecting beyond the end of the pin, a socket in the bottom face of the concavity for receiving the projecting end of the plunger, the bottom face of the concavity acting as a cam surface to retract the plunger during the assembly of the male and female members, and a slot narrower than the diameter of the said socket in the bottom face of the concavity and extending from the socket to the surface of the female member whereby access may be had to the plunger to retract the same and permit disengagement of the male and female members.

EMORY GLENN SIMPSON.
WILLIAM SCHNELL.